United States Patent [19]

Okada

[11] Patent Number: 4,893,199

[45] Date of Patent: Jan. 9, 1990

[54] DIGITAL SIGNAL RECORDING APPARATUS WITH A DIGITAL SUBDATA CONVERTING CAPABILITY

[75] Inventor: Kentaro Okada, Tokyo, Japan

[73] Assignee: Sony Corporation, Tokyo, Japan

[21] Appl. No.: 241,505

[22] Filed: Sep. 7, 1988

[30] Foreign Application Priority Data

Sep. 16, 1987 [JP] Japan ................... 62-231785

[51] Int. Cl.$^4$ .......................... G11B 5/09; G11B 5/00
[52] U.S. Cl. ......................................... 360/48; 360/32
[58] Field of Search ............................. 360/48, 32, 60

[56] References Cited

U.S. PATENT DOCUMENTS 4,414,585 11/1983 Van Gestel ........................... 360/48
4,644,546 2/1987 Doi et al. ....................... 340/825.44

OTHER PUBLICATIONS

*PC Magazine*, "Building Workgroup Solutions: Ethernet Cards", Derfler, Jr., Jan. 31, 1989, pp. 155–157.

*Primary Examiner*—Vincent P. Canney
*Attorney, Agent, or Firm*—Philip M. Shaw, Jr.

[57] ABSTRACT

A digital recording apparatus for recording signals received by means of a digital interface format composed of a category code, specifying a device on the transmission side, digital main data, and digital subdata for control, includes means for judging the category code of the received data. When the judged category code is different from the category code of a recording apparatus, means are provided for converting the digital subdata into the necessary digital subcode data for the recording apparatus and the data is thereafter recorded.

3 Claims, 13 Drawing Sheets

| | $Q_1$ $Q_2$ $Q_3$ $Q_4$ | $Q_5$ $Q_6$ $Q_7$ $Q_8$ | $Q_9$ $Q_{10}$ $Q_{11}$ $Q_{12}$ $Q_{13}$ $Q_{14}$ $Q_{15}$ $Q_{16}$ |
|---|---|---|---|
| | FLAG | ADDRESS<br>0 0 0 1 | TRACK NUMBER  PNO |
| $Q_{17}$ | INDEX | | MINUTES  P-TIME |
| $Q_{33}$ | SECONDS  P-TIME | | FRAME NUMBER OF SUBCODE |
| $Q_{49}$ | (UNDECIDED)<br>0 0 0 0 0 0 0 0 | | ABSOLUTE TIME  A-TIME |
| $Q_{65}$ | ABSOLUTE TIME  A-TIME | | ABSOLUTE NUMBER OF FRAME |
| $Q_{81}$ | ERROR DETECTION CODE (CRC CODE) | | |

Column markers at top right: $Q_{32}$, $Q_{48}$, $Q_{64}$, $Q_{80}$, $Q_{96}$

FLAG:
- 0 0 X 0 } AUDIO USE
- 0 0 X 1 } EMPHASIS ON/OFF
- 0 1 X 0   DIGITAL DATA RECORDING
- X X 0 X } COPY PROHIBITION
- X X 1 X } YES/NO
- X : DON'T CARE

| W1 | | | W2 | |
|---|---|---|---|---|
| SUB CODE ID | | | SUBCODE ID | BLOCK ADDRESS |
| CONTROL ID | DATA ID | 1 | FORMAT ID | X X X 0 |
| PNO ID (2) | PNO ID(3) | 1 | PNO ID (1) | X X X 1 |

MSB                  LSB MSB                  LSB

|   | DATA ID | FORMAT ID | CONNOTATION |
|---|---------|-----------|-------------|
|   | 0 0 0 0 | x x x | SUBCODE DATA CONTAINS A PACK. FORMAT ID INDICATES A PACK APPLIED AREA. |
|   | 0 0 0 1<br>0 1 1 1 | RESERVED ||

Fig. 10

| SYNC | CTL ID | 0000 | 1 F ID | XXX0 | PARITY | PACK 1 | PACK 3 | PACK 5 | PACK 7 |
|------|--------|------|--------|------|--------|--------|--------|--------|--------|
| SYNC | PNO 2  | PNO 3 | 1 PNO1 | XXX1 | PARITY | PACK 2 | PACK 4 | PACK 6 | C1 |

Fig. 11

| WORD NAME | MSB | | | | LSB |
|-----------|-----|---|---|---|-----|
| PC 1 | ITEM | 1 | 2 | 3 | 4 |
| PC 2 | 5 | 6 | - | - | - |
| PC 3 | | | | | |
| PC 4 | | | | | |
| PC 5 | | | | | |
| PC 6 | | | | | |
| PC 7 | - | - | - | - | 52 |
| PC 8 | PARITY | | | | |

| BIT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | | | CONTROL | | | | MODE (0 0) | | | | | | | | | |
| 16 | NUMBER OF SOURCE | | | | CHANNEL NUMBER | | | | SAMPLING FREQUENCY | | | | CATEGORY CODE Cc | | | |
| 32 | BIT 32 TO BIT 191 UNUSED | | | | | | | | | | | | | | | |
| ---- | | | | | | | | | | | | | | | | |
| 176 | | | | | | | | | | | | | | | | |

ACCURACY OF A SAMPLING FREQUENCY

| | SUBCODE SYNC WORD | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | | |
| | 0 | 0 | 0 | 0 | 0 | 0 | 0 | 0 | 0 | 0 | 0 | 0 | | 0th FRAME |
| 13 | 0 | 0 | 0 | 0 | 0 | 0 | 0 | 0 | 0 | 0 | 0 | 0 | | FIRST FRAME |
| 25 | 1 | Q1 | R1 | S1 | T1 | U1 | V1 | W1 | 0 | 0 | 0 | 0 | | SECOND FRAME |
| 37 | 1 | Q2 | R2 | S2 | T2 | U2 | V2 | W2 | 0 | 0 | 0 | 0 | | THIRD FRAME |
| ... | . | . | . | . | . | . | . | . | . | . | . | . | | ... |
| 1165 | 1 | Q96 | R96 | S96 | T96 | U96 | V96 | W96 | 0 | 0 | 0 | 0 | | 97th FRAME |

Fig.15B

| | SUBCODE SYNC WORD | | | | | | | | | | | | | |
|---|---|---|---|---|---|---|---|---|---|---|---|---|---|---|
| | 0 | 0 | 0 | 0 | 0 | 0 | 0 | 0 | 0 | 0 | 0 | 0 | | |
| 13 | 0 | 0 | 0 | 0 | 0 | 0 | 0 | 0 | 0 | 0 | 0 | 0 | | |
| 25 | 1 | Q1 | R1 | S1 | T1 | U1 | V1 | W1 | 1 | Q2 | R2 | S2 | | MIN. LENGTH WORD (=8) |
| 37 | T2 | U2 | V2 | W2 | 0 | 0 | 0 | 0 | 0 | 0 | 0 | 0 | | |
| 49 | 1 | Q3 | R3 | S3 | T3 | U3 | V3 | W3 | 0 | 0 | 0 | 0 | | MAX. LENGTH WORD (=16) |
| 61 | 0 | 0 | 0 | 0 | 1 | Q4 | R4 | S4 | T4 | U4 | V4 | W4 | | |
| 73 | 1 | Q5 | R5 | S5 | T5 | U5 | V5 | W5 | 0 | 0 | 0 | 0 | | |
| 85 | . | . | . | . | . | . | . | . | . | . | . | . | | |

DIGITAL SIGNAL RECORDING APPARATUS WITH A DIGITAL SUBDATA CONVERTING CAPABILITY

BACKGROUND OF THE INVENTION

1. Filed of the Invention

This invention relates to an apparatus for recording digital signals and, more particularly, to an apparatus for recording a digital signal transmitted from one device, which has a different format than the recording apparatus, by converting the format of the digital signal into the format of the recording apparatus.

2. Description of the Background

Conventionally, in digital audio devices, such as a compact disc (hereunder called "CD") or a digital audio tape recorder (hereunder called "DAT"), for example, the lead-out, recording and playback of a digital signal are performed on the basis of respective digital signal formats which are different for each device.

Therefore, even if a digital signal is sent for recording from a device having one format on the transmission side to a device having a different format on the reception side by merely connecting the mutual digital devices, the digital signal cannot be sent directly nor can the digital signal be recorded on the reception side.

To enable the transmission of a digital signal between different kinds of devices and the recording of the digital signal based on that transmission, a so-called digital interface format (hereunder called "I/O format") has been determined.

In the case where the transmission of a digital signal is performed using the above-mentioned I/O format, a device on the reception side receives the digital signal while always confirming a category code specifying the kind of a device on the transmission side. If the kinds of the devices on the transmission and reception sides are the same, that is, when the category codes are the same, both the digital audio data and the digital subdata (subcode) are accepted and recorded on the device on the reception side. However, if the kinds of the devices are different and the category codes are different, the digital audio data is accepted and recorded but the digital subdata (subcode) is judged to be unsuitable for decoding so that it cannot be accepted or recorded.

For this reason, when the category codes are different, a subcode such as a signal for detecting the head of a piece, for example, cannot be recorded with the result that audio data cannot be used effectively even if the audio data is recorded laboriously on the reception side.

OBJECTS AND SUMMARY OF THE INVENTION

An object of the invention is, therefore, to provide a digital recording apparatus capable of recording a digital signal as a whole adequately on the reception side by converting (digital subdata of) the digital signal transmitted using a digital interface format from the transmission side into necessary data on the reception side even when a digital device having a data format different from the reception side is connected to the transmission side.

In this invention, a digital recording apparatus for recording signals received by means of a digital interface format composed of a category code, specifying a device on the transmission side, digital main data, and digital subdata for control, includes means for judging the category code of the received data. When the judged category code is different from the category code of the recording apparatus, means are provided for converting the digital subdata into the necessary digital subcode data for the recording apparatus and the data is thereafter recorded.

More particularly, a digital signal sent through a digital interface based on an I/O format from a digital device on the transmission side is divided into audio data $D_A$ and subcode (control signals) at an input dividing circuit on the reception side. The digital audio data $D_A$ is directly output to a digital signal processing circuit, and the subcode is further divided into user data U and a channel status C. The channel status C of the subcode is output to a category decoding circuit and the user data U is output to a microcomputer for decoding.

The above-described category decoding circuit judges the kind of a device on the transmission side on the basis of a category code $Cc$ of the channel status C.

In the case where the device on the transmission side is a different kind of digital device having a data format different from the reception side, a discrimination signal $SI_1$ is output to the microcomputer.

In response to the discrimination signal $SI_1$ indicating that a device on the transmission side is different from that on the reception side, the microcomputer develops various kinds of subcode data, for instance, start ID (S-ID), a track (piece) number (PNO), a program duration time (P-Time), an absolute duration time for the whole recording (A-Time), etc. based on user data U supplied from a digital input dividing circuit. The microcomputer then outputs the above-mentioned subcode data obtained from the user data U to the digital signal processing circuit.

The digital signal processing circuit converts the above-described audio data $D_A$ and various kinds of subcode data into the recording format of a DAT, which is a recording device on the reception side and performs recording.

Here, when the category decoding circuit judges that the device on the transmission side is the same kind of device and has the same category code as the reception side, a discriminating signal $SI_2$ is output to the microcomputer.

In response to the discrimination signal $SI_2$, the microcomputer separates a start ID (S-ID), a sync (SYNC) and a shortening ID as subcode data from the user data U. The microcomputer then outputs the above-mentioned subcode data to the digital signal processing circuit.

The digital signal processing circuit converts the above-stated audio data $D_A$ and subcode data into a DAT recording format and performs recording.

The above and other objects and features of the present invention will become apparent from the following detailed description with reference to the accompanying drawings, in which like numerals represent the same or similar elements.

DETAILED DESCRIPTION OF PREFERRED EMBODIMENTS

Hereunder, one embodiment of the present invention will be explained with reference to the drawings. The explanation will be made in the following order;

(a) The format of a digital output signal of CD.
(b) The format of a digital output signal of a DAT.
(c) The format (I/O format) of a digital audio interface.
(d) The transmission data conversion of a digital output signal from CD to DAT.

(a) The format of a digital output signal of CD.

Figure 1:
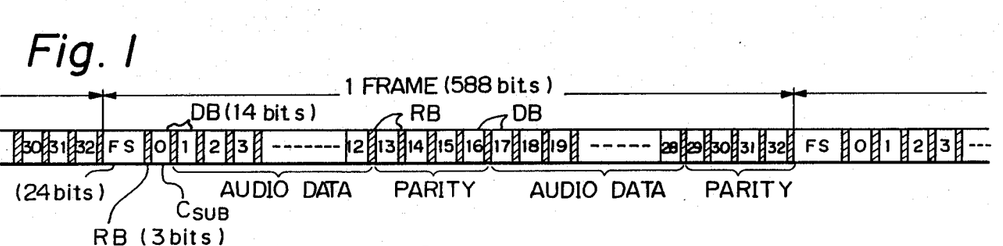
FIGS. 1 and 2 are schematic diagrams respectively for use in explaining the data format of a compact disk.
Figure 2:
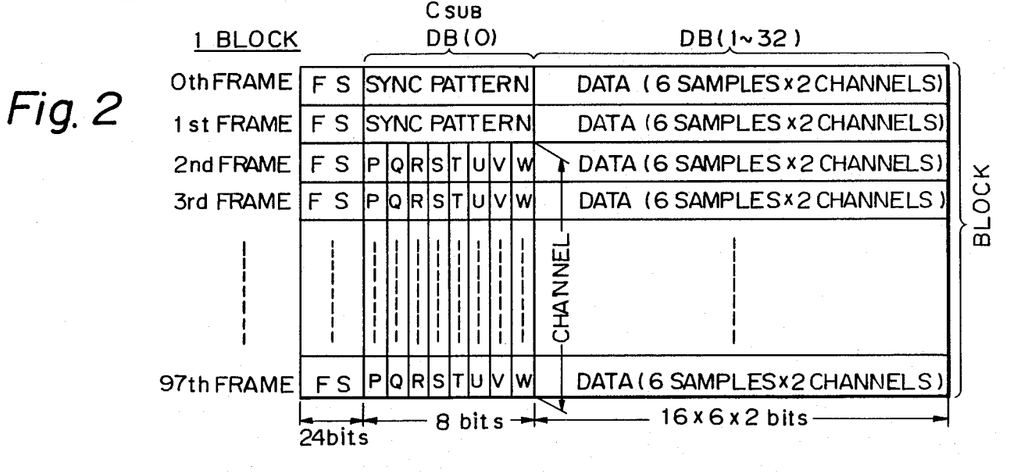

In a compact disk, a digital signal (in this section called a "digital output signal") is converted and recorded in a digital data format shown in FIGS. 1 and 2.

As shown in FIG. 1, this data format handles 588 bits as one frame, and a sync pattern FS of a particular pattern is added to the head for each frame. The zero-th to the 32-nd bits following the frame sync FS are comprised of an alternating pattern of direct-current-component suppressing bits RBs, of three bits each, followed by data bits DBs, each having 14 bits.

The zero-th data bit DB is a subcode $C_{SUB}$ corresponding to digital subdata and is employed for playback control of a disk. The 1-th to 12-th and 17-th to 28-th data bits DB are allotted to the audio data $D_A$ as digital audio data, and the remaining 13-th to 16-th and 29-th to 32-nd data bits DBs are assigned to parity data for the error correction code. For each data bit DB, eight-bit data is converted into 14 bits by a known 8 to 14 conversion process on recording.

The 98 frames of the above-mentioned digital data are called one block, and with this one block various kinds of processes are carried out.

FIG. 2 shows a data format in which one block (98 frames) are arranged in the order shown by eliminating the direct-current-component suppression bits RB and forming each data bit DB with eight bits. As shown in FIG. 2, a subcode $C_{SUB}$ of each frame is composed of one symbol (8 bits), and 98 symbols constructs one subcode frame. Subcode areas of the frames 0 and 1 form a subcode sync pattern that is a predetermined bit pattern. Also, each of the eight bits of the subcode $C_{SUB}$ are separately labeled, P, Q, R, S, T, U, V, W, respectively, beginning from the side of the sync pattern FS.

Figure 3:
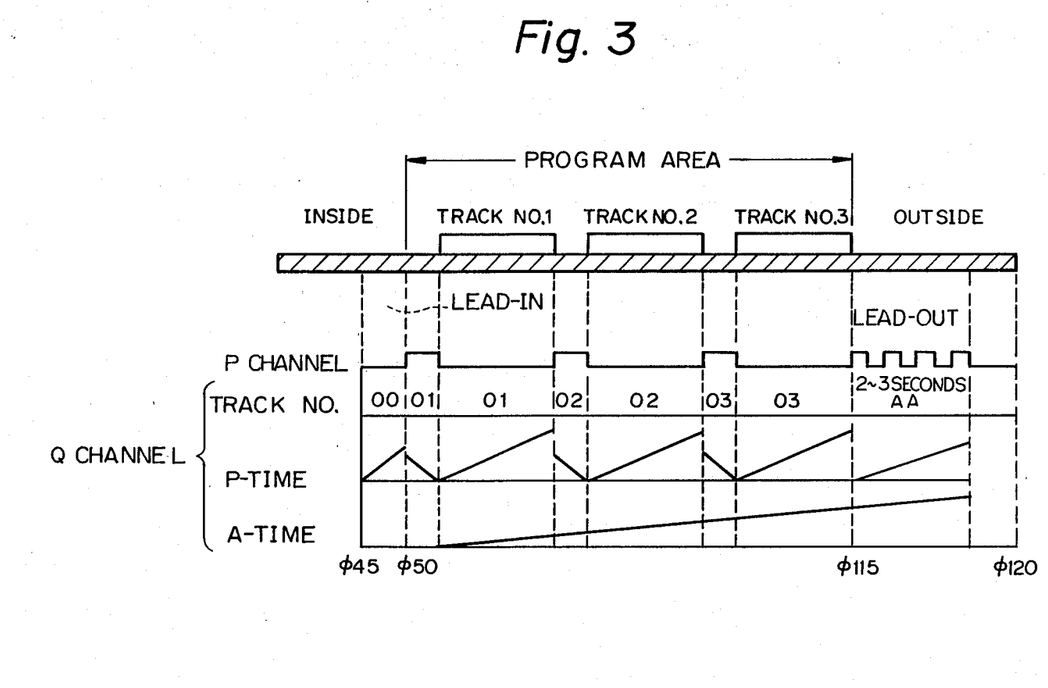
FIG. 3 is a diagram showing the relationship between the P and Q channels on a compact disk.

The physical correspondence between the P, Q channels of the subcode $C_{SUB}$ and CD is shown in FIG. 3. A lead-in area starts at the inner diameter of the CD at about 46 mm and ends with 50 mm. After this is a program area of up to a maximum of 116 mm followed by a lead-out area. Also, a TOC (Table of Contents) is in the subcode Q channel of the lead-in portion.

The P channel indicates the beginning of the lead-in area, the lead-out area and each track (piece of music). This P channel is a flag for indicating a pause and music. The flag takes a low level for music and a high level for a pause and has a pause of a period of 2 Hz in the lead-out area. As a result, by detecting and counting the P channel, designated music can be selected.

Figure 4:
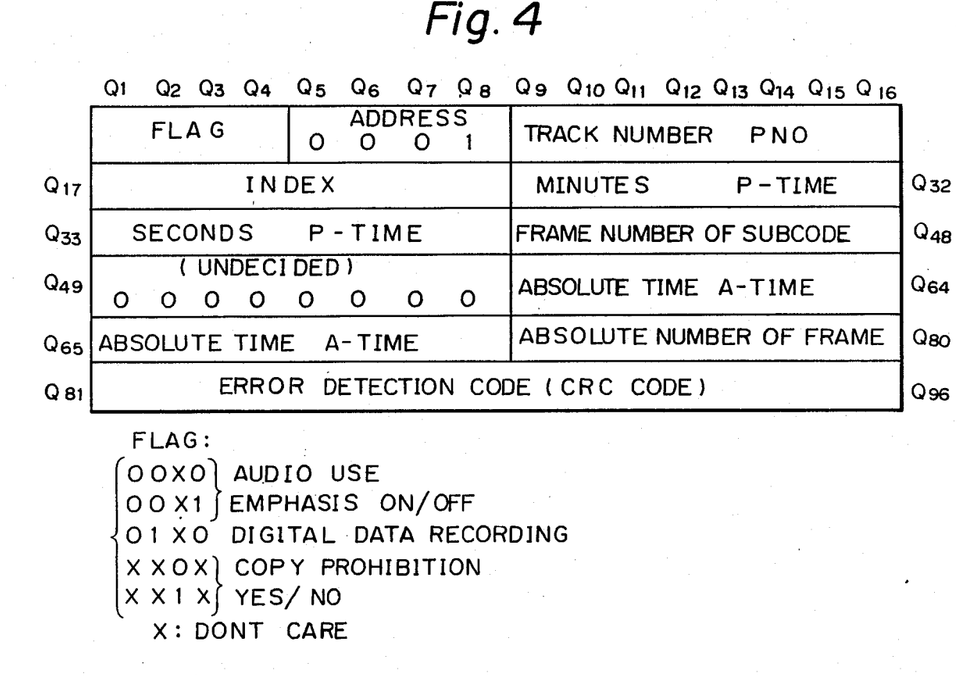
FIG. 4 is a schematic diagram showing a bit arrangement of the Q channel shown in FIG. 2 and a control bit format.

The Q channel can perform the same kind of control in a more complicated manner and the bit construction in the Q channel is shown in FIG. 4.

In FIG. 4, the presence or absence of audio emphasis, the presence or absence of the prohibition of digital copying and information indicative of either a CD-ROM for audio purposes or a CD-ROM for computer purposes are contained in a flag. Also, a track number PNO shows the piece numbers from 1 to 99. The track number PNO number 00 means a lead-in track and AA means a lead-out track. It is possible to divide each track into 1 to 99 by an index number. Here, an index number 00 means a muting interval. Also, there are two kinds of time codes, i.e., P-Time of track number unit and absolute time or A-Time as shown in FIG. 3. The P-Time of a track number unit is reset for each track, and the A-Time starts at the beginning of a music program and is continued until the whole program ends.

By inputting the information of this Q channel into a microcomputer provided in the disk reproduction unit, random selection of music such as immediate movement to the playback of other music during the course of music reproduction can be done.

Channels R to W (six-bit parallel data) disposed after the P, Q channels are employed as graphic data and used to display the poet, the composer of a piece recorded in a disk, its explanation, poem, etc. or to explain the piece with voice.

(b) The format of a digital output signal of a DAT.

Figure 5:
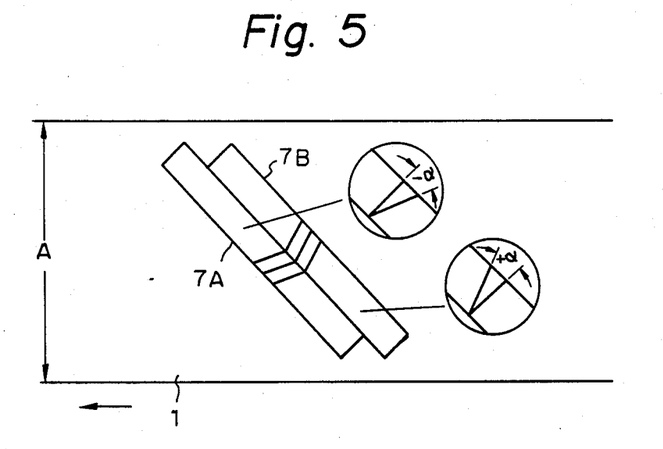
FIG. 5 is an explanatory diagram showing the tape format of a DAT.
Figures 6A, 6B, 6D:
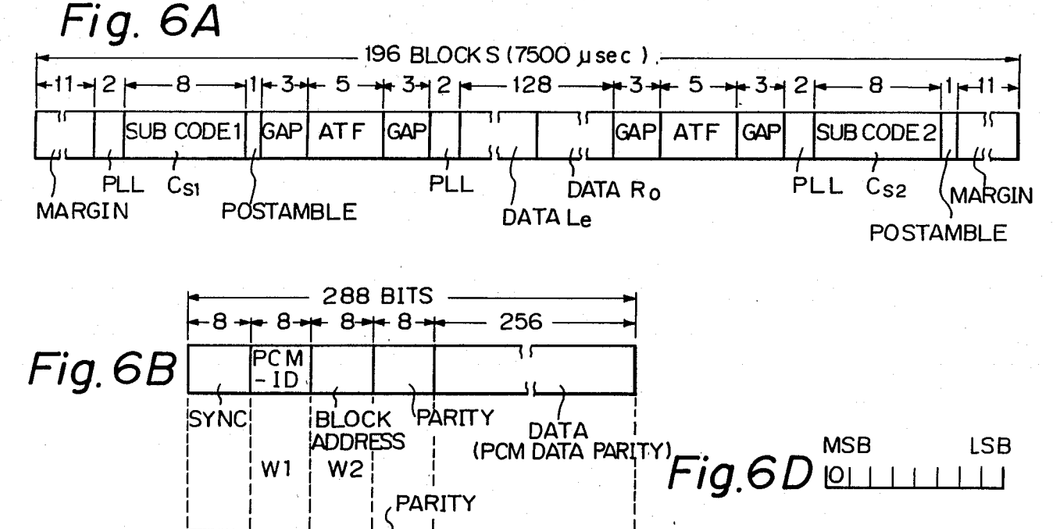
FIG. 6A through E is a schematic diagram for explanation of a track format and a block format of a DAT.

As shown in FIG. 5, the entire data recorded on each of the tracks 7A, 7B formed in an inclined state within a magnetic tape 1 having a width A is called "segment". Here, in FIG. 5, ± α indicates the head gap angle azimuth (α=20°) and the azimuth angles are mutually opposite in the adjacent tracks 7A, 7B. Also, an arrow indicates the tape forwarding direction. FIG. 6A shows a recording format of one segment.

When it is assumed that a unit amount of recording data is one block, data of 196 blocks (7500 μsec) is contained in one segment. As can be seen from FIG. 5, one frame is made up of two tracks 7A and 7B formed by the heads A and B. Each of the tracks 7A and 7B has a length corresponding to the rotation of each of the respective heads through an angle of 90° and is partitioned from its lower end (i.e. from right to left in the figure) into 5.051° of a margin area of 11 blocks, 0.918° of a 2 block preamble area for the PLL of the sub-code, 3.673° of an 8 block first sub-code $CS_1$, 0.459° of a 1 block postamble area, 1.378° of a 3 block interblock gap area in which data is not recorded, 2.296° of a 5 block pilot signal for ATF tracking area, 1.378° of a 3 block interblock gap area, 0.918° of a 2 block preamble area for the PLL of data, 58,776° of a 128 block data area, 1,378° of a 3 block interblock gap area, 2,296° of a 5 block AFT signal area, 1.378° of a 3 block interblock gap area, 0.918° of a 2 block preamble area for the PLL of the sub-code, 3.673° of an 8 block, second sub-code area $CS_2$, 0.459° of the 1 block postamble area, and 5.051° of the 11 block margin area. It should be noted that the scale of the respective areas in FIG. 6 is not exact.

The PCM signal is composed of a two-channel stereo PCM signal consisting of L (left) and R (right) channels and parity data of an error detection/correction code. In the case where the one segment shown in FIG. 6A is recorded/reproduced by a magnetic head (not shown), audio data $L_e$ is recorded on the left half side of the PCM signal recording area and audio data $R_o$ is recorded on the right half side. The audio data $L_e$ is made up of even numbered audio data of the L channel and parity data for that data, while the audio data $R_o$ is composed of odd numbered audio data of the R channel and parity data for that data. The even number and the odd number are the ones counted from the beginning of an interleave block. Similarly, one segment of data is recorded on a track formed by the other magnetic head with the same structure as one track mentioned above. The purpose of recording audio data of the even number and the odd number of each channel on two adjacent tracks separately and that audio data of the L channel and the R channel are recorded on the same track is to prevent errors of continuous data of the same channel due to drop-out, etc.

FIG. 6B shows the data block structure of the PCM data signal. At the start of the block, an eight-bit (i.e. one symbol) block synchronization signal is added, and an eight-bit PCM-ID, W1, is then added. Next to the PCM-ID, a block address W2 is added. The processing of error correction and coding of a simple parity is performed with respect to the two symbols W1 and W2 of the PCM-ID and the block address. The resulting eight-bit parity is added next to the block address and following that is placed the PCM data with its parity.

The block address W2 is composed of seven bits except for the most significant bit (MSB) as shown in FIG. 6D. A value of "0" as the most significant bit indicates that this block is the PCM data block.

The block address W2 of seven bits varies sequentially from (00) to (7F) (hexadecimal notation). The PCM-ID is defined so that the three least significant bits of a block address may be recorded at each of blocks (000) (010) (100) (110). An optional code of the PCM-ID can be recorded in each block address having less significant bits (001) (011) (101) (111) of the block addresses. ID1 to ID8, each having two bits, and a frame address of four bits are contained in the PCM-ID. In the ID1 to ID7, respective identification information is defined. For example, the ID1 is a format ID for identifying whether it is for audio use or other use, the ID2 identifies pre-emphasis ON/OFF and the characteristic of the pre-emphasis, and the ID3 identifies a sampling frequency. The number of channels, the bit number of quantization, the track width, and permission or inhibition of digital copying are identified by the ID4, ID5, ID6 and ID7, respectively. Also, the ID8 is a code for constructing a pack, and a pack is composed of 32 ID8s. The ID1 to ID7 and the frame address are regarded as the same data in the segment of interleave pair. Rewriting (after-recording) cannot be carried out for the PCM-ID differently from the subcode ID recorded in the subcodes 1, 2.

Figure 6C:
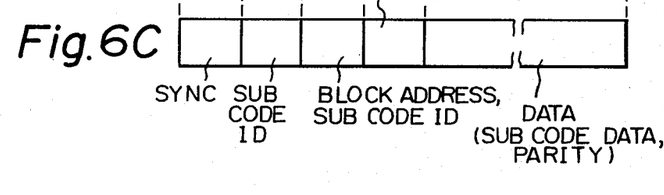
Figure 6E:
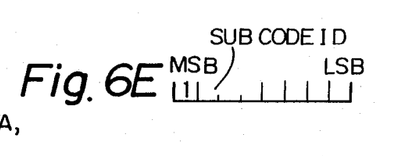

FIG. 6C shows the data block structure of the subcode $C_s$ (e.g. $CS_1$) as digital subdata. It has a data structure similar to the above-mentioned PCM block. As shown in FIG. 6E, when the most significant bit of the symbol W2 of the subcode block is set to "1, " this indicates that the block is a subcode block. The four least significant bits of the symbol W2 are regarded as a block address, and eight bits of the symbol W1 and three bits, except for the MSB and the block address of the symbol W2, are treated as a subcode ID. The error correction processing and coding of a simple parity is done with regard to the two symbols (W1 and W2) of the subcode block so as to add an eight-bit parity.

Figure 7:
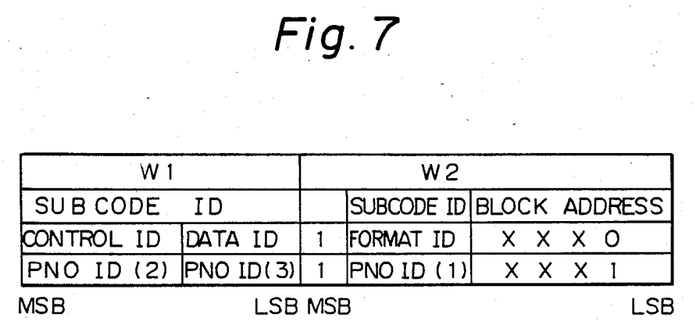
FIG. 7 is a schematic diagram explaining a subcode ID of DAT.

The subcode IDs take different data depending on whether there is an even numbered block address (LSB of the block address is "0") or odd numbered block address (LSB of the block address is "1"). Namely, as shown in FIG. 7, the subcode ID of a block whose block address has the least significant bit "0" is made up of a control ID and a data ID, each of which is composed of four bits. The subcode ID of a block whose block address has the least significant bit "1" is composed of PNO ID(2) and PNO(3). A subcode forming a word W2 contains a four-bit format ID in the case of a block whose block address has the least significant bit "0", while it contains the PNO ID(1) in the case of a block whose block address has the least significant bit "1".

Figure 8:
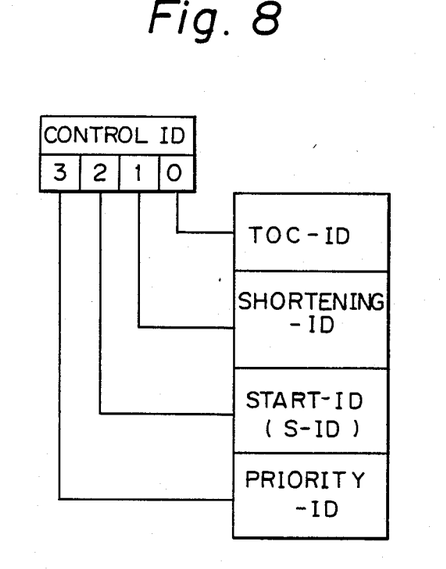
FIG. 8 is an explanatory diagram for explaining a control ID of DAT.

A program number, a lead-in area, a lead-out area, etc. are represented by three of the PNO ID(1) to PNO ID(3). A control ID designating a playback method, a time code, etc. are included in the subcode ID. The subcode data has been subjected to error-correction-code processing by the Read-Solomon code in a manner similar to the PCM data. It is to be noted that the subcode ID can be rewritten differently from the above-mentioned PCM-ID. The above-described control ID represents control information composed of four-bit data as shown in FIG. 8, and each bit is set for a priority ID, a start ID (S-ID) a shortening-ID, a table of contents ID (TOC-ID) from the MSB side in that order. The priority ID, the S-ID, the shortening ID and the TOC-ID indicate the presence or absence of after-recording of a piece number, the start of the piece and separation, fast forwarding until the next S-ID, and the presence or absence of TOC recording, respectively. Here, the start ID (S-ID) is a signal indicating the start of a program and is recorded for nine seconds (normal mode) from the start of a piece. At the time of playback, the start detection of the piece is executed by searching for this signal. Also, in the case of "1" as the priority ID, a priority is given to a piece number specified at the PNO-ID.

Figure 9:
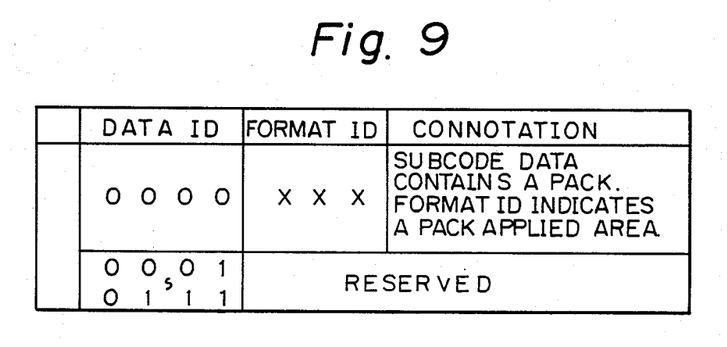
FIG. 9 is a schematic diagram for explaining a data ID.

The data ID and the format ID are defined as shown in FIG. 9. In the case of 0000 as the data ID, the subcode data contains a pack, and the format ID indicates an applied area of the pack. With respect to data ID other than all "O"s, no special definition is given.

Figure 10:
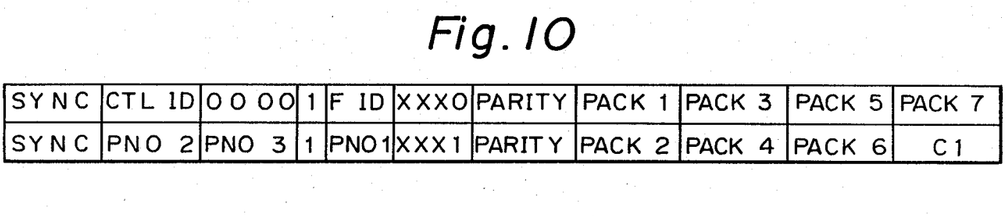
FIGS. 10 and 11 are schematic diagrams for explaining a subcode ID and subcode data of a DAT.
Figure 11:
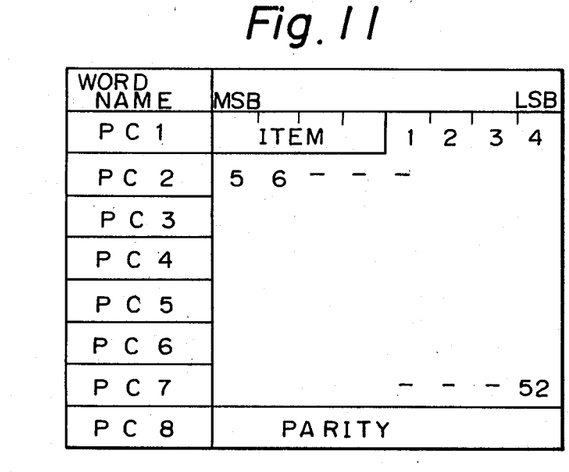

The subcode block shown in FIG. 6C has a structure more specifically shown in FIG. 10. FIG. 11 shows that two adjacent subcode blocks are represented as one and that the subcode data has a pack construction.

Each pack has a data structure consisting of 64 bits (8 symbols) as shown in FIG. 11. In FIG. 11, the recording direction is the longitudinal direction, and word names are attached from PC1 to PC8 for every eight bits in the horizontal direction. The first four bits of the word PC1 are treated as one item, and with this item, the contents of the pack are indicated as follows:

Item (0000):
it means that all of PC1 and PC8 are "0"s.
Item (0001):
it means that data of the pack represents the program time.
Item (0010):
it means that data of the pack represents the absolute time of a tape.
Item (0011):
it means that data of the pack represents the duration of one recording.
Item (0100):
it means that data of the pack represents TOC data.
Item (0101):
it means that data of the pack represents year, month, date, a day of the week, time.
Item (0110):
it means that data of the pack indicates a catalog number.
Item (0111):
it means that data of the pack indicates ISRC (The International-Standard-Recording code).
Item (1111):
it means that data of the pack is defined by a maker of a software tape.

Items other than the above-mentioned ones are not defined.

Also, the word PC8 of the pack is made as a simple parity code of the words PC1 to PC7.

As shown in FIG. 10, a maximum of seven of said packs (pack 1 to pack 7) and a C1 parity are placed sequentially in two blocks. The number of packs is indicated by the format ID. For example, in the case of the format ID of (000), the number of packs is zero; in the case of the format ID of (001), only there is only pack 1; in the case of format ID of (111), there are packs 1 to 7.

(c) The (I/O format) of a digital audio interface.

FIG. 12 shows a format of a digital audio interface (hereunder called "I/O format").

Figure 12A:
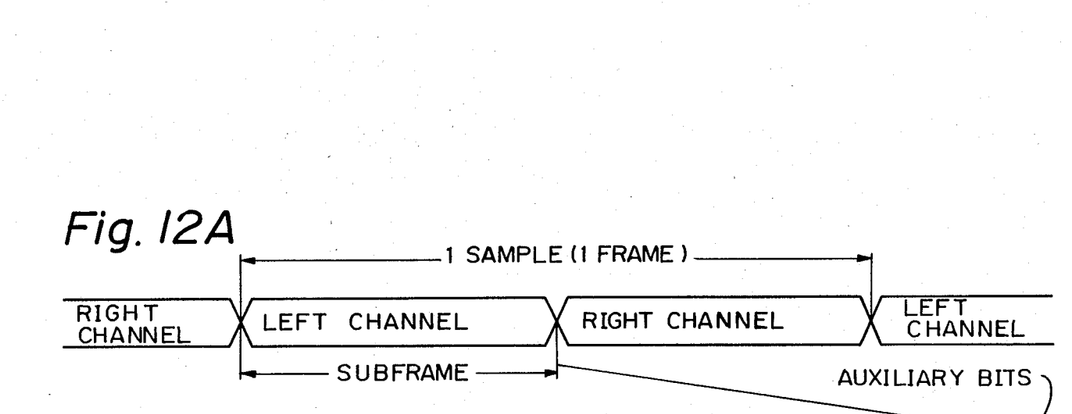
FIG. 12A and B are a schematic diagram for explaining a digital audio interface format.
Figure 12B:
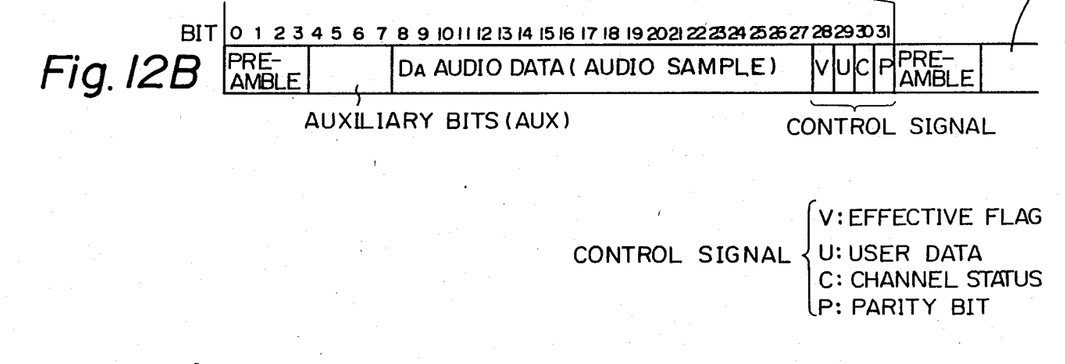

As shown in FIG. 12A, it is assumed that a sampling period (1/Fs) is one frame to give a basic unit. Each digital output signal of the left (L) channel and the right (R) channel in this one frame is transmitted in the order from LSB (the least significant bit) to the left channel and the right channel, respectively. Data corresponding to each channel is called a "subframe," and FIG. 12B shows one subframe. A subframe is composed of 32 bits, and two subframes (both of the left and right channels) make one frame.

As shown in FIG. 12B, a preamble (four bits) for a synchronization for head detection and identification of a subframe is added to the head of the subframe. This allows for the identification of the left and right channels and judgement for whether it is the head of a block. The four next bits are auxiliary bits (AUX) and following that are 20 bits of audio data $D_A$ bits (audio sample) disposed as digital main data. After the audio data $D_A$, control signals, each having one bit, are disposed as digital subdata represented by V, U, C, P. The auxiliary bits, audio data $D_A$ and control signals are biphase-mark modulated.

V is a validity flag to indicate whether data is correct. The flag shows that data of a subframe is valid (reliable) if it is "0", while it shows that the data is invalid (unreliable) if it is "1". For example, if both of the left and right channels are sent and the V of only the right channel is a "1", a digital device on the reception side reads only the left channel. U is user data, C is a channel status, and P is a parity bit. An even party is used for the parity bit, for example, and error detection of the auxiliary bits, audio data $D_A$ and the control signals is carried out.

Figure 13:
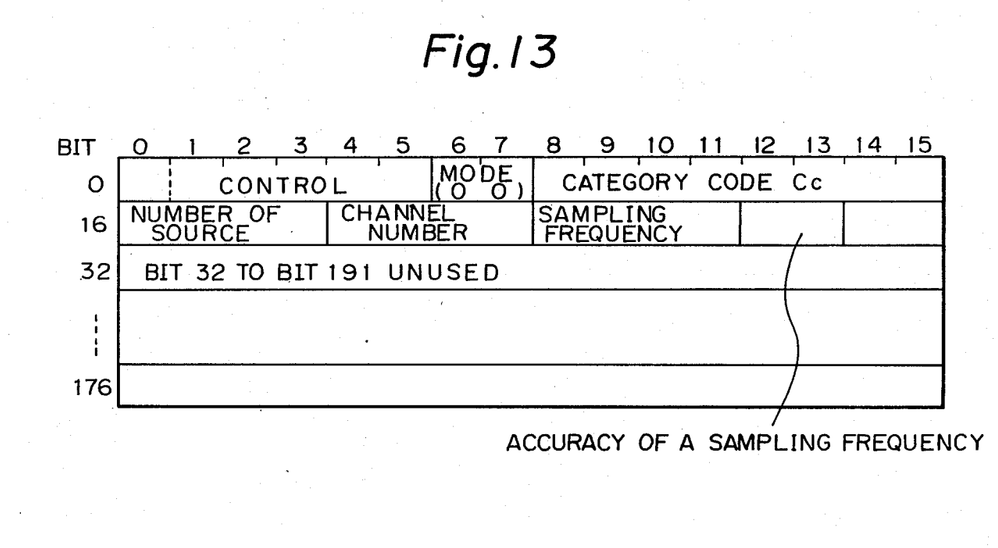
FIG. 13 is a schematic diagram showing a format of a bit arrangement of a channel status shown in FIG. 12.

As shown in FIG. 13, the channel status C is defined by a data format in which 192 bits (one word) contained in the respective subframes are gathered. Here, the channel status constructs one block with 192 frames and this one block forms channel statuses of the left and right channels (two words).

By this one word (192 bits) of channel status, the kind of a device on the transmission side, the sampling frequency, etc. are indicated. Specifically, the first bit (bit O) of one word identifies home use (private use) and broadcasting use. Assuming that the home use has a mode II and the broadcasting use has a mode I, different formats are allotted to them, respectively. The presence and absence of emphasis and prohibition of digital copying (bit 2) are then defined by control bits 1 to 5. Therefore, the presence and absence of the prohibition of copying is judged by examining the control bit 2. The designation of a device on the transmission side is performed by a category code Cc formed of bit 8 to bit 15, and a sampling frequency is indicated by bit 24 to bit 27. Further, the accuracy of the sampling frequency is indicated using two bits of bit 28 and bit 29.

The error of the sampling frequency is defined by bits 31, 32. This is because there is a problem that a device on the reception side cannot follow the sampling, depending on the degree of dispersion of the sampling frequencies and because of copying with this problem. Here, the subcode (control signals V, U, C, P) are dealt with the unit of a block (192 frames).

(d) Transmission and conversion of a digital output signal from CD to DAT.

Figure 14:
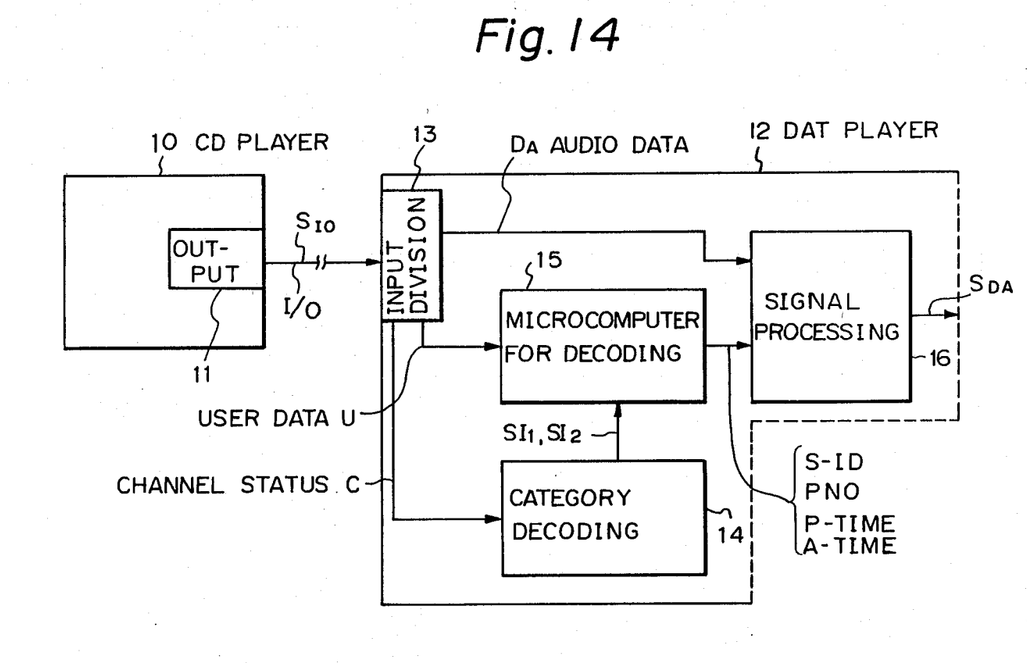
FIG. 14 is a block diagram showing one embodiment of a digital recording apparatus to which the present invention is applied.

As shown in FIG. 14, assuming that a digital audio device on the transmission side is a CD player and a digital recording device on the reception side is a DAT recorder/player, an example in which a digital output signal transmitted from the CD player is data-converted and recorded with DAT recorder/player will be explained.

As shown in FIG. 14, a digital input dividing circuit 13, a category decoding circuit 14, a microcomputer 15 for decoding and a digital signal processing circuit 16 are provided in a DAT recorder/player 12. In the CD player 10, a digital-output-forming circuit 11 is provided. The digital-output-forming circuit 11 is for converting a compact disk (CD) output signal, having a format shown in FIG. 1, into an I/O format shown in FIG. 12 and outputting its converted signal. The digital-output-forming circuit 11 in the CD player 10 and the input dividing circuit 13 in the DAT recorder/player 12 are connected by an interface cable which could be an optical transmission or a coaxial cable, for example.

The input dividing circuit 13 divides the digital output signals $S_{IO}$ supplied from the CD player 10 on the basis of and I/O format into audio data $D_A$ and subcode data composed of the control signals V, U, C, P. The audio data $D_A$ is given to the digital signal processing circuit 16. Also, the channel status C is supplied to the category decoding circuit 14, and the user data U is given to the microcomputer 15.

The category decoding circuit 14 judges that the kind of a digital device on the transmission side is a CD player 10 on the basis of the category code Cc of the channel status C given from the input dividing circuit 13. The category decoding circuit 14 outputs a discrimination signal $SI_1$ to the microcomputer 15 when the kinds of the devices on the transmission and reception sides are different.

The microcomputer 15 develops the user supplied subcode data such as the start ID (S-ID), the track number, i.e. the piece number (PNO), the time of the piece (P-Time), the absolute time (A-Time), etc., from the input dividing circuit 13 and outputs the data to the digital signal processing circuit 16 according to a predetermined timing.

The digital signal processing circuit 16 takes in the audio data $D_A$ supplied from the input dividing circuit 13 and the subcode data fed from the microcomputer 15 according to the predetermined timing and reformats them into the DAT recording format shown in FIG. 6A for output and recording by a recording section (not shown) of the DAT recorder/player 12.

The following are examples of how the DAT recorder/player 12 performs data conversion and recording of a digital output signal $S_{IO}$ formatted according to the I/O format from the transmission side:

1. Formation of the digital output signal $S_{IO}$ based on the I/O format on the CD player 10 side.
2. Data conversion processing and conversion into a DAT format of the digital output signal $S_{IO}$ in the DAT recorder/player 12.
3. Processing and conversion into the DAT format of a digital output signal in a device on the reception side when the CD player 10 is changed into a DAT recorder/player.

1. Formation of the digital output signal $S_{IO}$ based on an I/O format in the CD player 10.

First, the audio data $D_A$ of the CD shown in FIG. 1 is transferred into the slot of the audio data $D_A$ of an I/O format shown in FIG. 12B for each sample. In this case, in the CD format, there are twelve samples of audio data $D_A$ (six samples × two channels) per frame as shown in FIG. 2. However, since only two samples of the audio data $D_A$ per frame can be transmitted in the I/O format as shown in FIG. 13B, six frames (6×2=12 subframes) in the I/O format are needed to transmit the audio data $D_A$ of one frame of CD.

Figure 15A:
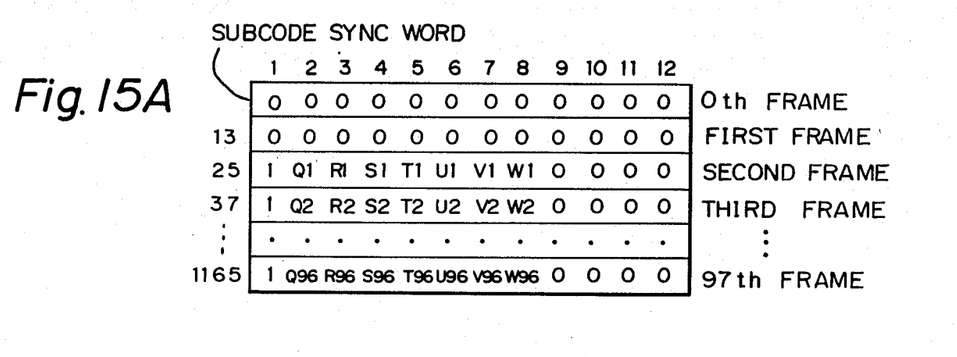
FIGS. 15A and B, 16A through F and 17A through C are schematic diagrams for respectively explaining an example for converting a digital signal based on a subcode of CD into a digital audio interface format.

As a result, one frame of the CD subcode similarly corresponds to six frames of the I/O format, and the slots of six preambles and twelve bits (six frames × two subframes × one bit/subframes = twelve bits) for each of the control signal V, U, C, P are provided. Namely, the control signals V, U, C, P per one frame of CD are each twelve bits. Consequently, the control signals V, U, C, P form a data format of 98 frames (corresponding to one block of CD) in the longitudinal direction, 12 bits in the lateral direction (corresponding to one frame of CD) as shown in FIG. 15A.

Hereafter, how each subcode is added to this data format is shown.

Figure 15B:
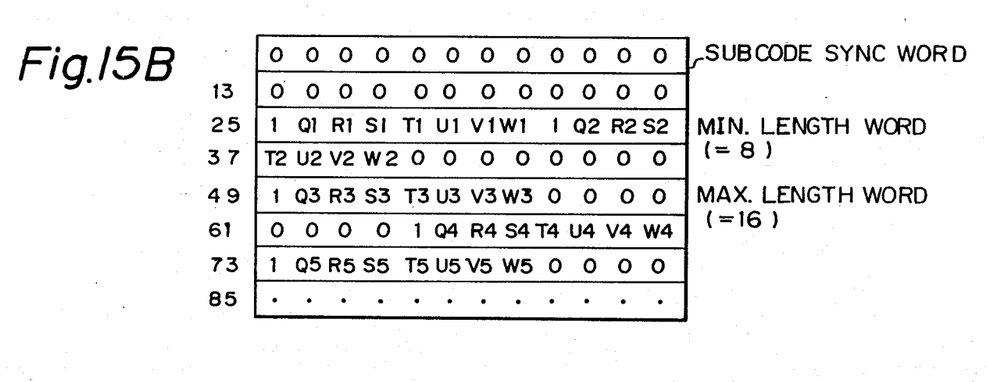

A flag for validity or invalidity is added to the control signal V (validity) for every sample. The control signal U (user data) forms one subcode block of 98 frames. The subcode sync word is a minimum of 16 "0" bits. In the case of FIG. 15A, 24 "0" bits in the 0th and 1st frames are the subcode sync word. A start bit ("1"), a subcode (Qi to Wi of the i-th frame of CD and dummy bits (i.e., "0"s) are inserted, respectively, at the first bit of the head, the second to the eight bits, and the ninth to the twelfth bits are shown in FIG. 15A. A distance W.L. (Word Length) between the start bits is varied between 8 bits and 16 bits by changing the number of the dummy bits as shown in FIG. 15B. Data of the format shown in FIG. 13 is encoded depending on a predetermined code contained in the control signal C (channel status). A parity bit for even parity is added to the control signal P (parity). In this way, the CD audio data $D_A$ and subcode $C_{SUB}$ are converted into an I/O format, respectively to be the digital output signal $S_{IO}$ and produced serially to the DAT recorder/player 12 from the CD player 10.

2. Data conversion processing and conversion into a DAT format of the digital output signal $S_{IO}$ in the DAT player 12.

The input dividing circuit 13 divides the received digital signal $S_{IO}$ into digital audio data $D_A$ and subcode (control signals).

The audio data $D_A$ is directly output to the digital signal processing circuit 16, and the subcode is further divided into the user data U and the channel status C. The channel status C in the subcode is output to the category decoding circuit 14, and the user data U is output to the microcomputer 15.

The above-mentioned category decoding circuit 14 judges the kind of device on the transmission side based on the category code Cc of the channel status C. In this example, the device on the transmission side is the CD player 10, and a discrimination signal $SI_1$ indicating that it is a different kind of device from the DAT recorder/player is given to the microcomputer 15.

Figures 16A, 16B:
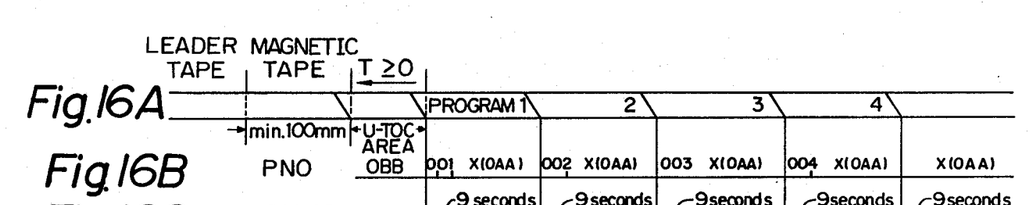
Figures 16C, 16D, 16E:
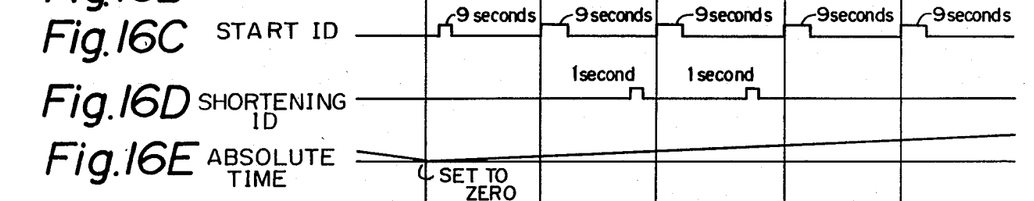
Figure 16F:
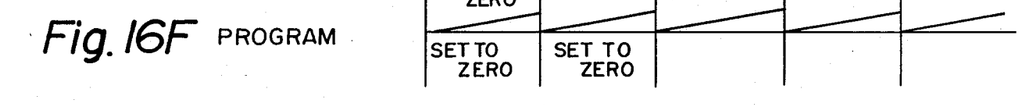

The microcomputer 15 develops various kinds of DAT subcode data, for example, a start ID (S-ID), a track number, i.e. piece number (PNO), a progress time P-Time, an absolute time A-Time, etc. as shown in FIGS. 4 and 16 based on the user data U to the digital signal processing circuit 16 according to a predetermined timing.

The microcomputer 15 then outputs various kinds of data obtained from the user data U to the digital signal processing circuit 16 according to a predetermined timing.

The digital signal processing circuit 16 converts the above-mentioned audio data $D_A$ and various kinds of subcode data into a recording format shown in FIG. 6A to form a digital output signal $S_{DA}$ and outputs and records it onto a recording section (not shown) of the DAT recorder/player 12.

In the recording, parity is added to the audio data $D_A$ and recorded in a data area of a PCM block.

In addition, with respect to the subcode data of a DATA, the start ID (S-ID) is continuously recorded in the bit of the start ID provided in the subcode ID (control ID shown in FIG. 8) for nine seconds from the head of a piece as shown in FIG. 16. Also, a track number PNO is recorded in the PNO-ID provided in the subcode ID.

The program time (P-Time) and the absolute time (A-Time), etc. are respectively recorded on packs shown in FIG. 10 provided in the DAT subcode data area.

In such a manner, the subcode data of the digital output signal $S_{IO}$ is converted into data necessary for the DAT recorder/player 12 on the reception side and processed and then made into the digital output signal $S_{DA}$ together with the audio $D_A$ to be recorded according to the DAT format.

3. Processing and conversion into the DAT format of a digital output signal when the device 10 is changed to a DAT recorder/player.

When the device 10 on the transmission side is changed from a CD player to a DAT recorder/player, the user data U becomes "1" in each timing shown in FIG. 17. A sync SYNC, a start ID and a shortening ID are identified by this timing of "1." It is judged that the device 10 on the transmission side is the same kind of digital device having the same category code as the device 12 on the reception side. A discrimination signal $SI_2$ indicative of that effect is produced to the microcomputer 15.

Figure 17A:
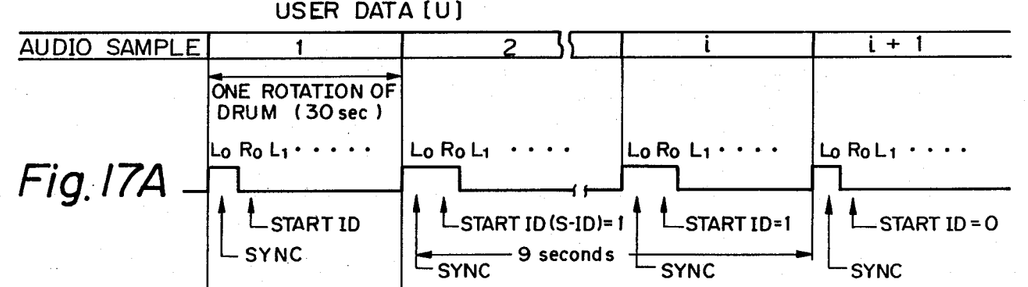
Figure 17B:
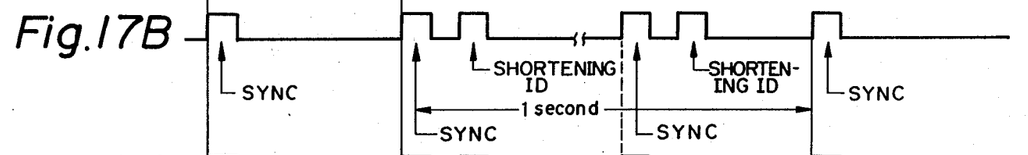
Figure 17C:
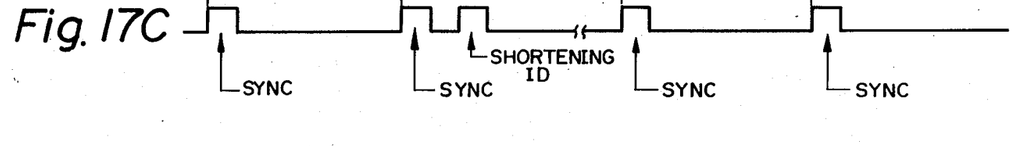

In response to the above-mentioned discrimination signal $SI_2$, the microcomputer 15 develops subcode data from the start ID (S-ID), the sync SYNC and the shortening ID shown in FIGS. 17A to C among the user data U. The user data U becomes 37 1" in response to the sync SYNC at a predetermined timing (each word $L_o$ or almost every 30 m sec) as shown in FIG. 17, and the SYNC is output to the digital signal processing circuit 16. The user data U becomes 37 1" in response to the start ID (S-ID), indicating the start of a program at the predetermined timing, to give a continuous state with said SYNC (namely, word $R_o$ following $L_o$ of every 30 m sec as shown in FIG. 17A), and the start ID is output to the digital signal processing circuit 16. This start ID has been set to a "1" for nine seconds from the head of a program (a piece) as shown in FIG. 16C for searching the piece, and the start ID is detected by the DAT recorder/player 12 to perform the head detection of the piece.

Further, when the microcomputer 15 detects the shortening ID inserted in the program as shown in FIGS. 16 and 17 from the control signal U (user data), it outputs the shortening ID to the digital signal processing circuit 16. The digital signal processing circuit 16 converts the audio data $D_A$ and subcode data into a DAT recording format for output and recording by a recording section (not shown) of the DAT recorder/player 12. Namely the audio data $D_A$ is recorded in a data area of the PCM block and the DAT format, and with respect to the subcode data the start ID (S-ID) and the shortening ID are recorded, respectively, at each bit of the corresponding start ID and shortening ID of the control ID shown in FIG. 9. Also, the sync SYNC is recorded at the head of each program for synchronization to perform the head detection.

Here, although digital audio devices such as the CD player 10 and the DAT payer 12 are exemplified for explanation in this embodiment, it goes without saying that they are not limited to those devices but may be applicable to digital devices generally.

Since an apparatus for recording a digital signal according to the present invention detects a category code based on a signal transmitted by a device on the transmission side through a digital interface and when the detected category code is different from its own category code, digital subdata is converted into its own necessary data and stored. For this reason, digital subdata of a digital signal transmitted from the transmission side through the digital interface can be converted into necessary data on the reception side. This operation occurs even if the transmitting digital device has a data format different from that of the receiving device. As a result, a digital signal can be recorded as a whole in a more desirable state on the reception side.

Consequently, since digital, control subdata (subcode) can be recorded, in addition to digital audio main data, differently from the conventional system, such operations as head detection of pieces and skipping can be done. As a result, the digital audio data recorded on the reception side can be fully used.

What is claimed is:

1. An apparatus for recording a transmitted digital signal formatted according to a predetermined digital interface format which includes main data, digital subcodes, such as a device category code, user data and channel status, wherein the recording apparatus is capable of recording digital main data and digital subcode data, including a category code specifying the recording apparatus' device type, according to a predetermined format, the recording apparatus comprising:
   means supplied with the transmitted digital signal for detecting from the digital subcodes a category code indicating the type of device which transmitted the digital signal;
   means supplied with the transmitted digital signal for converting the transmitted digital subcode data into corresponding subcode data formatted according to the format of the recording apparatus when the detected category code is different from its own category code;
   whereby the recording apparatus is enabled to record the received main digital data and the converted subcode data onto a recording medium.

2. An apparatus as claimed in claim 1, further comprising:
   means supplied with the transmitted digital signal for separating the main data, user data and channel status from the digital interface; and
   wherein the means for detecting detects the category code from the separated channel status data.

3. An apparatus as claimed in claim 1, the apparatus includes a digital audio tape recorder and the means for converting generates subcode of the digital audio tape recorder such as a start ID and a track number based on user data.

* * * * *